E. E. CULLEN.
FLY SWATTER.
APPLICATION FILED FEB. 28, 1919.

1,326,577.

Patented Dec. 30, 1919.

INVENTOR
Ernest E. Cullen
BY
Stuart L. Barnes
ATTORNEY.

UNITED STATES PATENT OFFICE.

ERNEST E. CULLEN, OF ANCHORVILLE, MICHIGAN, ASSIGNOR OF ONE-HALF TO GEORGE E. VERNIER, OF FAIR HAVEN, MICHIGAN.

FLY-SWATTER.

1,326,577.  Specification of Letters Patent.  Patented Dec. 30, 1919.

Application filed February 28, 1919. Serial No. 279,771.

*To all whom it may concern:*

Be it known that I, ERNEST E. CULLEN, a citizen of the United States, residing at Anchorville, county of St. Clair, State of Michigan, have invented a new and useful Improvement in Fly-Swatters, of which the following is a specification.

This invention relates to fly swatters and comprises a pick-up device by which the fallen flies may be picked up with the swatter without requiring the use of the hand or other aids. The device is of minimum simplicity and can be added to the conventional form of swatter with very little additional cost.

In the drawings,—

The fly swatter shown is the ordinary mesh or screen fly swatter with an oval frame $a$, a twisted wire stem $b$ and a wooden handle $c$. Many persons do not like to pick up the flies after they have been killed with the swatter and they are either left to lie where they fall or else they are brushed up with a broom, brush or other implement.

Figure 1:
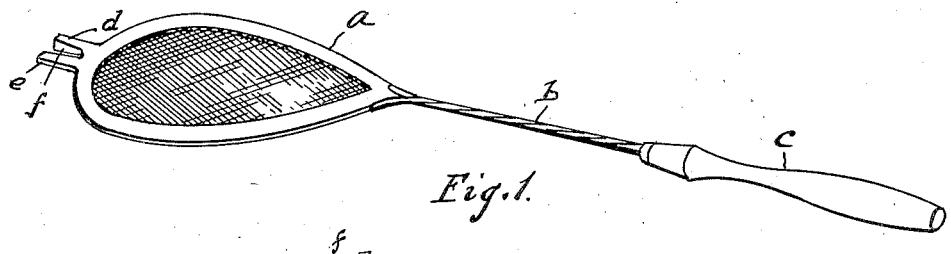
Figure 1 is a perspective of a fly swatter equipped with the preferred form of my device.
Figure 2:
Fig. 2 is a view looking at the end of the swatter showing how a fly is held between the prongs of the rubber tongs.

The object of this simple invention is to provide a device that can be attached to the swatter itself to effect this purpose in a very simple way and yet be harmless to the furniture. As shown in the drawings, the frame $a$ is covered along its outside with a coating of vulcanized rubber although it is not necessary that this be the case as my pair of prongs may be glued to the metal frame itself or otherwise attached. In the drawing, however, the fingers are shown as vulcanized to the rest of the rubber. They comprise simply a pair of rubber prongs having a narrow prong $d$ and a wide prong $e$ which merge into each other at the base and which have a V-like opening $f$ between them. The preferred form is shown in Figs. 1 and 2 and in this form the prongs protrude from the end of the fly swatter in the plane thereof. The wide prong $e$ is beveled on the inside.

Figure 5:
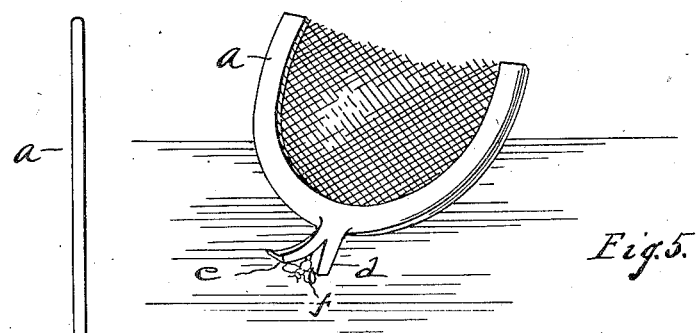
Fig. 5 is a view showing how the rubber tongs can be opened to grasp a fly.

The varying of the width of the prongs performs a very useful part in the operation of the prongs. The wider prong can be dragged along the table or other surface without any effort (see Fig. 5). This opens up the fingers. In this condition they are brought right up to the fly and then the stress on the wide prong is relieved. This allows the fingers to close because of their elasticity. They will then close upon the fly and pinch it between the two fingers. It may be disengaged from the tongs simply by hitting the swatter against any surface. The fly is only held in the tongs by a slight pressure due to his body spreading the elastic prongs.

It will be evident that the device is very simple to perform its purpose and yet is constructed of a material that will in no way mar the most highly polished surface when operating upon it.

Figure 3:
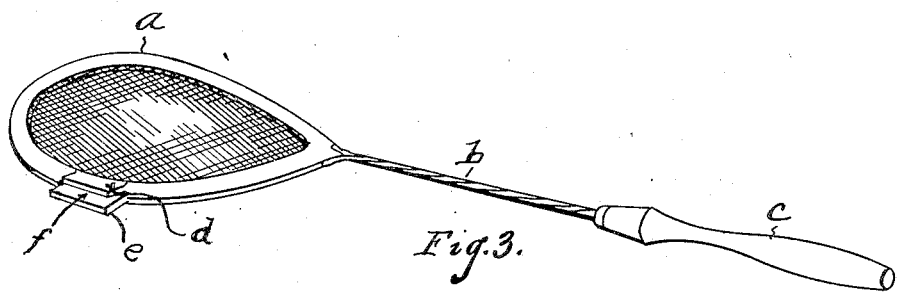
Fig. 3 is a perspective view of a fly swatter equipped with a modified form of the invention.
Figure 4:
Fig. 4 is an end view of the swatter showing this modified form of rubber tongs.

The modification shown in Figs. 3 and 4 operates upon the same principle except that the prongs are set on the side of the fly swatter and are materially wider.

What I claim is:

1. A fly swatter, comprising a handle portion and a striking portion, and a pair of fingers constructed of material having the soft and deformable characteristics of rubber, said fingers being attached to one of said portions and capable of being opened to receive a fly by dragging them along the surface and adapted to close upon a fly by relinquishing the dragging stress.

2. A fly swatter having attached thereto a pair of rubber fingers for picking up fallen flies.

3. The combination of a fly swatter in the form of a handle and a frame member having a web stretched thereover and fly pick-up fingers attached to one of the first two-mentioned members of the swatter.

4. The combination of a fly swatter in the form of a handle and a frame having a web stretched over same and a pair of rubber fingers attached to one of said members which can be spread to grasp a fallen fly.

5. The combination of a fly swatter provided with a handle, a frame, and a web stretched thereover and a pair of fly fingers of deformable material having prongs that may be temporarily distorted to grasp the body of a fallen fly.

6. The combination of a fly swatter provided with a handle, a frame having a web stretched thereover, and a pair of rubber fingers attached to one of said members and comprising one wide and one narrow prong, the wider prong adapted to drag on a surface and open the fingers to allow the same to grasp a fallen fly.

7. A pick-up device, comprising a block of rubber divided to form two comparatively flat and thin flexible prongs that meet at a sharp angle whereby when one of the prongs is dragged along a surface it will flex and open up the two prongs to allow the same to encompass an object and when the stress is released the prongs will assume their normal position and grasp the object.

8. A pick-up device, comprising a block of rubber divided to form two relatively flat and thin prongs meeting at a sharp angle, one of the prongs being wider than the other, whereby it may be dragged along a surface to open up the prongs to allow them to encompass an object which can be grasped when the prongs are allowed to assume their normal position.

In witness whereof I have hereunto set my hand on the 21st day of February, 1919.

ERNEST E. CULLEN.